: US 11,210,476 B2
(45) Date of Patent: Dec. 28, 2021

(12) United States Patent
Mathada et al.

(54) CHANGE DETECTION IN A STRING REPOSITORY FOR TRANSLATED CONTENT

(71) Applicant: NETFLIX, INC., Los Gatos, CA (US)

(72) Inventors: Shashidhara Mathada, San Jose, CA (US); Jose Moreno, San Jose, CA (US); Ballav Bihani, Fremont, CA (US); Pragya Pherwani, Sunnyvale, CA (US); Bharath Sampath, Mountain View, CA (US); Vidyalakshmi Vilathur Sundaram, Cupertino, CA (US); Kunal Bisla, Pleasanton, CA (US); Prosenjit Bhattacharyya, Half Moon Bay, CA (US)

(73) Assignee: NETFLIX, INC., Los Gatos, CA (US)

( * ) Notice: Subject to any disclaimer, the term of this patent is extended or adjusted under 35 U.S.C. 154(b) by 111 days.

(21) Appl. No.: 16/230,883

(22) Filed: Dec. 21, 2018

(65) Prior Publication Data
US 2019/0121861 A1 Apr. 25, 2019

Related U.S. Application Data

(63) Continuation of application No. 15/239,755, filed on Aug. 17, 2016, now Pat. No. 10,162,819.

(51) Int. Cl.
G06F 40/58 (2020.01)
G06F 40/45 (2020.01)
G06F 9/451 (2018.01)
G06F 40/42 (2020.01)
G06F 40/194 (2020.01)

(52) U.S. Cl.
CPC .............. *G06F 40/58* (2020.01); *G06F 9/454* (2018.02); *G06F 40/194* (2020.01); *G06F 40/42* (2020.01)

(58) Field of Classification Search
CPC .......... G06F 40/58; G06F 40/44; G06F 40/45; G06F 40/47
See application file for complete search history.

(56) References Cited

U.S. PATENT DOCUMENTS 6,735,759 B1 5/2004 Yamamoto et al.
6,829,759 B1 12/2004 Davis et al.
6,983,238 B2 * 1/2006 Gao .......................... G06F 8/51
704/8

(Continued)

FOREIGN PATENT DOCUMENTS

WO 2013/113135 A1 8/2013

OTHER PUBLICATIONS

Fontaine et al., Beyond Babel-Simplifying Translation with XML, 2004, Deltaxml pp. 1-11, RenderX (Year: 2004).*

(Continued)

*Primary Examiner* — Lamont M Spooner
(74) *Attorney, Agent, or Firm* — Arteqis Law Group, LLP

(57) ABSTRACT

A technique for translating text strings includes receiving a source language text string from an application, determining that a translated text string that includes a translation in a target language of the source language text string is not available for use by the application, transmitting the source language text string to a translation service for translation, receiving the translated text string from the translation service, and causing the translated text string to be available for use by the application.

20 Claims, 10 Drawing Sheets

(56) References Cited

U.S. PATENT DOCUMENTS

| | | | |
|---|---|---|---|
| 7,536,294 B1* | 5/2009 | Stanz | G06F 9/454 704/3 |
| 8,819,628 B2* | 8/2014 | Raj | G06F 40/47 717/122 |
| 11,003,838 B2* | 5/2021 | Van Assche | G06Q 10/063112 |
| 2001/0016940 A1 | 8/2001 | Davis et al. | |
| 2003/0040899 A1* | 2/2003 | Ogilvie | G06F 40/58 704/2 |
| 2003/0172196 A1* | 9/2003 | Hejlsberg | G06F 9/44 719/328 |
| 2004/0098731 A1* | 5/2004 | Demsey | G06F 9/542 719/328 |
| 2004/0193388 A1* | 9/2004 | Outhred | G06F 8/65 703/1 |
| 2004/0268311 A1 | 12/2004 | Pizzoli et al. | |
| 2005/0009538 A1 | 1/2005 | Mackay et al. | |
| 2005/0097109 A1* | 5/2005 | Bitsch | G06F 16/90344 |
| 2007/0174108 A1* | 7/2007 | Monster | G06Q 30/0205 705/7.32 |
| 2008/0162442 A1* | 7/2008 | Agarwal | G06F 16/8373 |
| 2008/0229274 A1* | 9/2008 | Cacenco | G06F 8/10 717/100 |
| 2008/0235383 A1 | 9/2008 | Schneider | |
| 2008/0262828 A1* | 10/2008 | Och | G06F 40/44 704/3 |
| 2009/0031291 A1 | 1/2009 | Adams | |
| 2009/0113445 A1* | 4/2009 | Sakashita | G06F 9/454 719/313 |
| 2009/0192783 A1* | 7/2009 | Jurach, Jr. | G06F 40/45 704/4 |
| 2009/0282394 A1* | 11/2009 | Raj | G06F 9/454 717/136 |
| 2009/0307365 A1 | 12/2009 | Mackay et al. | |
| 2009/0326917 A1* | 12/2009 | Hegenberger | G06F 40/45 704/7 |
| 2011/0019821 A1* | 1/2011 | Kino | H04N 1/00411 380/255 |
| 2012/0240039 A1* | 9/2012 | Walker | G06Q 10/10 715/265 |
| 2012/0330985 A1 | 12/2012 | Borzello et al. | |
| 2013/0197898 A1* | 8/2013 | Choi | G06F 40/40 704/3 |
| 2013/0226555 A1 | 8/2013 | Lerum et al. | |
| 2014/0047429 A1* | 2/2014 | Gaither | G06F 9/44526 717/170 |
| 2014/0047433 A1* | 2/2014 | Gaither | G06F 9/44526 717/176 |
| 2014/0136180 A1 | 5/2014 | Little | |
| 2014/0156282 A1 | 6/2014 | Madere et al. | |
| 2014/0249797 A1* | 9/2014 | Liu | G06F 40/58 704/2 |
| 2014/0278342 A1* | 9/2014 | Shoshan | G06F 40/40 704/2 |
| 2014/0372098 A1 | 12/2014 | Arseniev et al. | |
| 2015/0120274 A1* | 4/2015 | Forbush | G06F 40/58 704/2 |
| 2015/0149148 A1* | 5/2015 | Ramakrishnan | G06F 40/58 704/2 |
| 2016/0070640 A1* | 3/2016 | Clark | G06F 8/315 717/124 |
| 2016/0092440 A1 | 3/2016 | Bhuvaneswaran | |
| 2016/0162478 A1* | 6/2016 | Blassin | G06Q 10/06311 706/12 |
| 2017/0124069 A1* | 5/2017 | Bondarchuk | G06F 40/58 |
| 2017/0139904 A1* | 5/2017 | Dakss | G06F 40/58 |
| 2017/0169014 A1* | 6/2017 | Sotelo | G06Q 30/06 |
| 2019/0065485 A1* | 2/2019 | Hayashi | G06F 13/00 |

OTHER PUBLICATIONS

Wikipedia, XLIHH, Dec. 2015, pp. 1-5.
Wikipedia, Namespace, Nov. 2015.

* cited by examiner

CHANGE DETECTION IN A STRING REPOSITORY FOR TRANSLATED CONTENT

CROSS-REFERENCE TO RELATED APPLICATIONS

This application is a continuation of the co-pending U.S. patent application titled, "CHANGE DETECTION IN A STRING REPOSITORY FOR TRANSLATED CONTENT," filed on Aug. 17, 2016 and having Ser. No. 15/239,755. The subject matter of this related application is hereby incorporated herein by reference.

BACKGROUND OF THE INVENTION

Field of the Invention

The present invention relates generally to computer science and, more specifically, to change detection in a string repository for translated content.

Description of the Related Art

Commonly, consumer electronic devices, such as smartphones, TV set top boxes, and the like, can be loaded with software applications that are installed by the consumer. For example, to enable a particular video streaming service, a smart phone may include an installed JAVA application provided by the vendor of the video streaming service. The JAVA application can be designed to facilitate data transfer between the streaming service and the smartphone and provide a user interface for the streaming service that is compatible with the smartphone.

Applications installed on consumer electronic devices are typically updated periodically to introduce new features, fix software bugs, update the appearance of the user interface, etc. For updates to be enabled on a particular electronic device, an updated version of the application typically needs to be installed on the device and relaunched. One problem with this approach, however, is that some applications must be modified weekly or daily in order to update information, correct text strings, and/or provide other types of application updates. For example, a web-based vendor that serves an international customer base may frequently have newly translated text strings or revised strings of textual content that need to be added to the vendor's application. These types of updates may range from a few words or text strings to the addition of hundreds of newly translated text strings associated with a previously unsupported language. Having to reinstall and relaunch applications on a daily or weekly basis can quickly become an overly inconvenient and time-consuming process for end users.

As the foregoing illustrates, there is a need in the art for more effective techniques for updating applications with new and revised text strings and textual content.

SUMMARY OF THE INVENTION

One embodiment of the present invention sets forth a technique for translating text strings. The technique includes receiving a source language text string from an application, determining that a translated text string that includes a translation in a target language of the source language text string is not available for use by the application, transmitting the source language text string to a translation service for translation, receiving the translated text string from the translation service, and causing the translated text string to be available for use by the application.

At least one advantage of the disclosed techniques is that translated text strings can be made available for an application dynamically, so that the application does not need to be relaunched to use newly translated text strings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
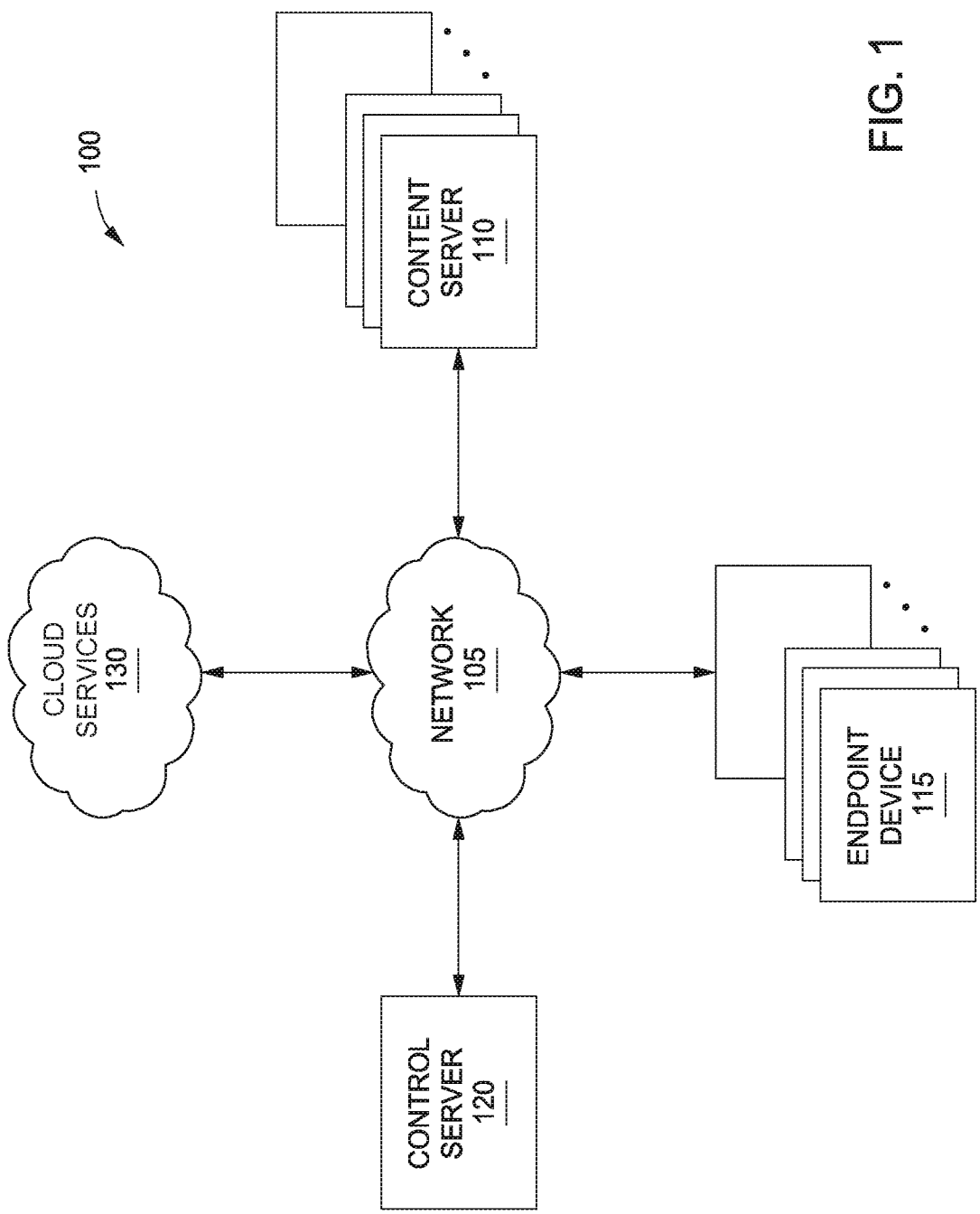
FIG. 1 illustrates a network infrastructure configured to implement one or more aspects of the present invention.

FIG. 1 illustrates a network infrastructure 100, according to various embodiments of the invention. As shown, the network infrastructure 100 includes content servers 110, control server 120, and endpoint devices 115, each of which are connected via a communications network 105. Network infrastructure 100 is configured to distribute content to content servers 110, and such content is then distributed on demand to endpoint devices 115.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "file," is then presented to a user of one or more endpoint devices 115. In various embodiments, the endpoint devices 115 may include computer systems, set top boxes, mobile computer, smartphones, tablets, console and hand-held video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with the control server 120 to determine the location and availability of various files that are tracked and managed by the control server 120. Each content server 110 may further communicate with cloud services 130 and one or more other content servers 110 in order "fill" each content server 110 with copies of various files. In addition, content servers 110 may respond to requests for files received from endpoint devices 115. The files may then be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the cloud services 130 may include an online storage service (e.g., Amazon® Simple Storage Service, Google® Cloud Storage, etc.) in which a catalog of files, including thousands or millions of files, is stored and accessed in order to fill the content servers 110. Cloud services 130 also may provide compute or other processing services. Although only a single cloud services 130 is shown in FIG. 1, in various embodiments multiple cloud services 130 may be implemented.

Figure 2:
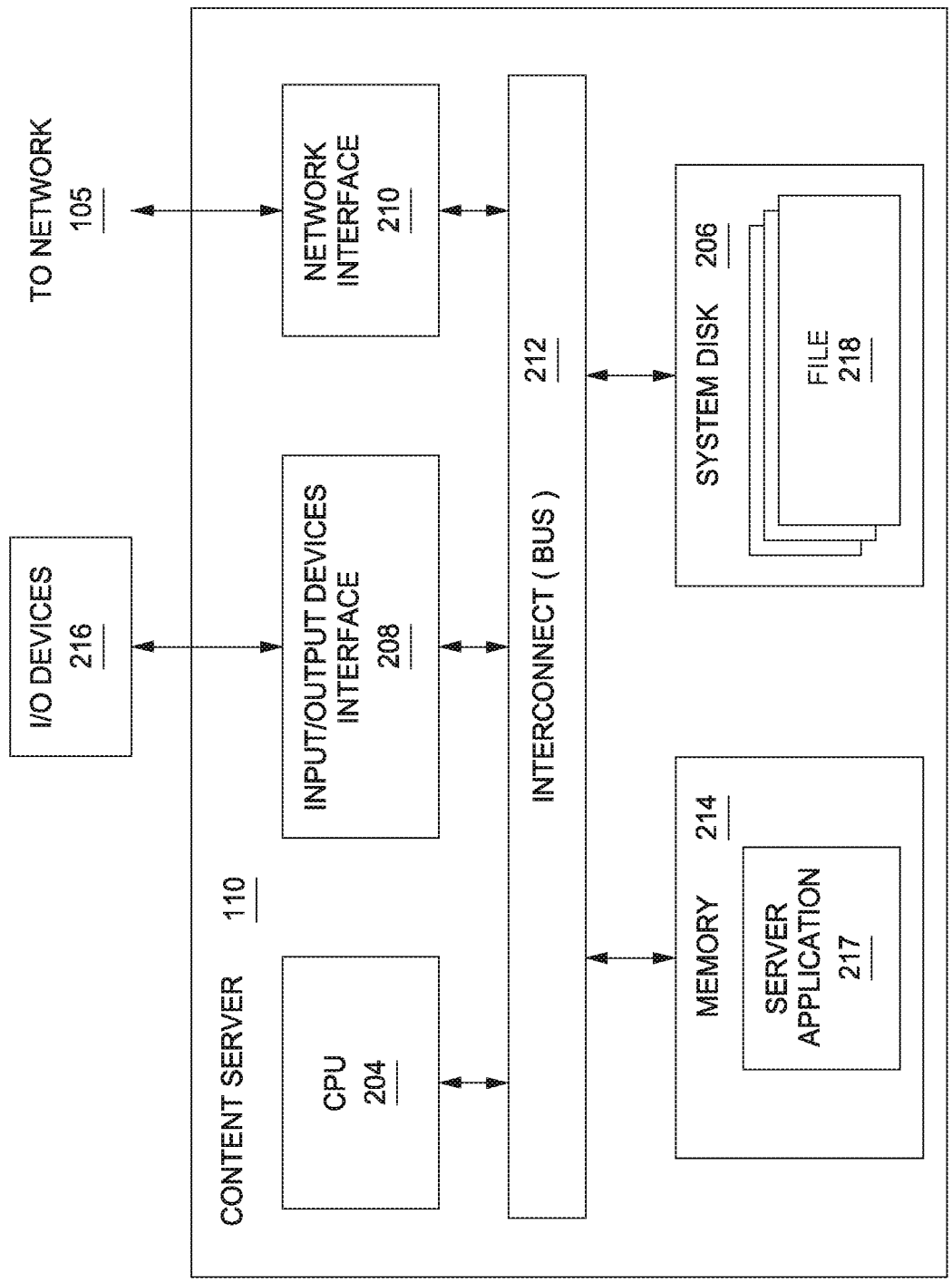
FIG. 2 is a more detailed illustration of the content server of FIG. 1, according to various embodiments of the present invention.

FIG. 2 is a more detailed illustration of content server 110 of FIG. 1, according to various embodiments of the present invention. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server application 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, subtitles, application files, software libraries, etc.). The files 218 can then be retrieved by one or more endpoint devices 115 via the network 105. In some embodiments, the network interface 210 is configured to operate in compliance with the Ethernet standard.

The system memory 214 includes a server application 217 configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or a content server 110 via the network 105.

Files 218 include a plurality of digital visual content items, such as videos and still images. In addition, files 218 may include textual content associated with such digital visual content items, such as movie metadata. For a particular digital visual content item, files 218 may include multiple translations of such textual content, so that users in different countries can interact with or request the particular digital visual content item regardless of the preferred language of the user.

Figure 3:
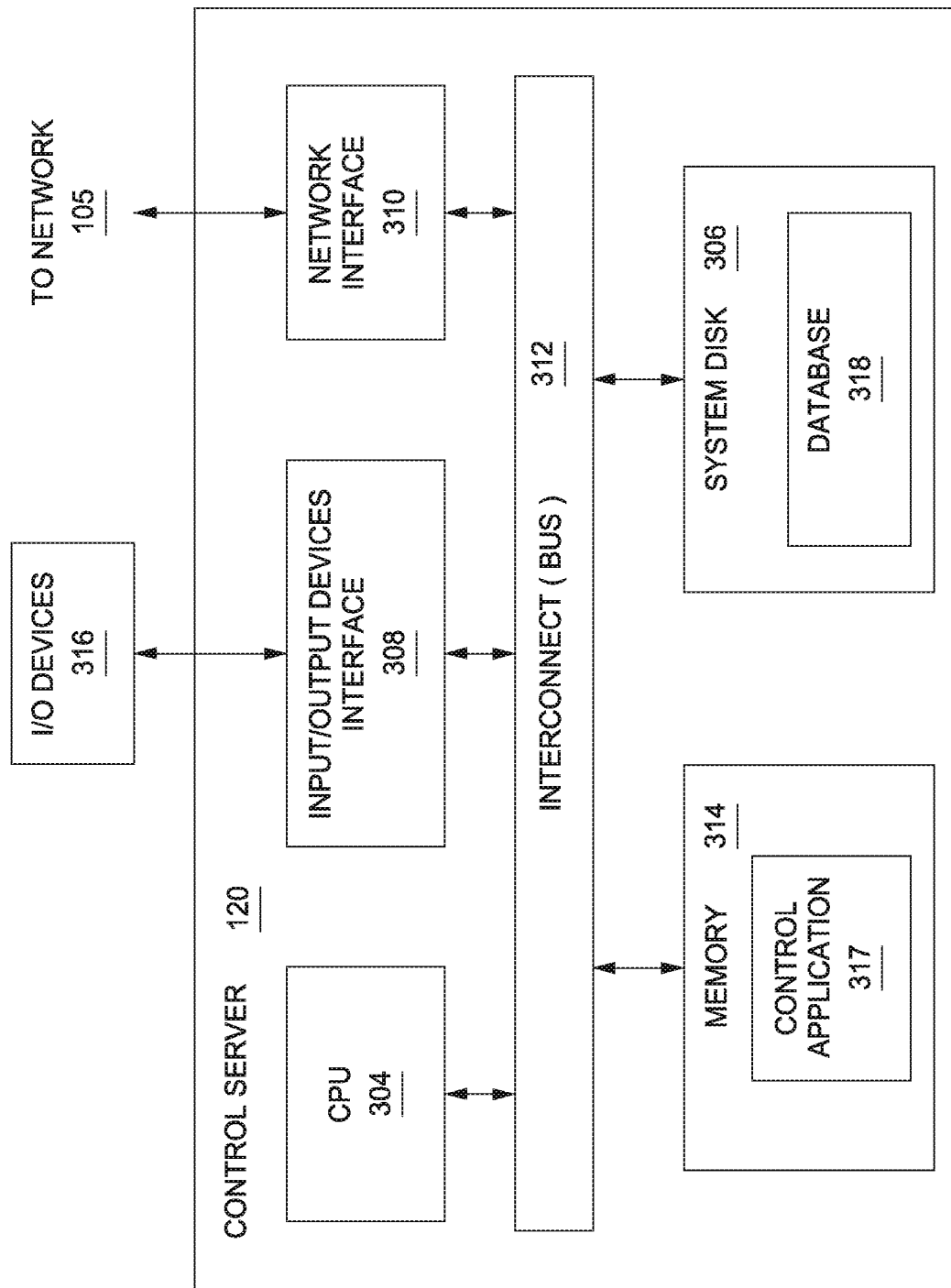
FIG. 3 is a more detailed illustration of the control server of FIG. 1, according to various embodiments of the present invention.

FIG. 3 is a more detailed illustration of control server 120 of FIG. 1, according to various embodiments of the present invention. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data (e.g., software libraries) and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 is configured to store a database 318 of information associated with the content servers 110, the cloud services 130, and the files 218.

The system memory 314 includes a control application 317 configured to access information stored in the database 318 and process the information to determine the manner in which specific files 218 will be replicated across content servers 110 included in the network infrastructure 100. The control application 317 may further be configured to receive and analyze performance characteristics associated with one or more of the content servers 110 and/or endpoint devices 115.

Figure 4:
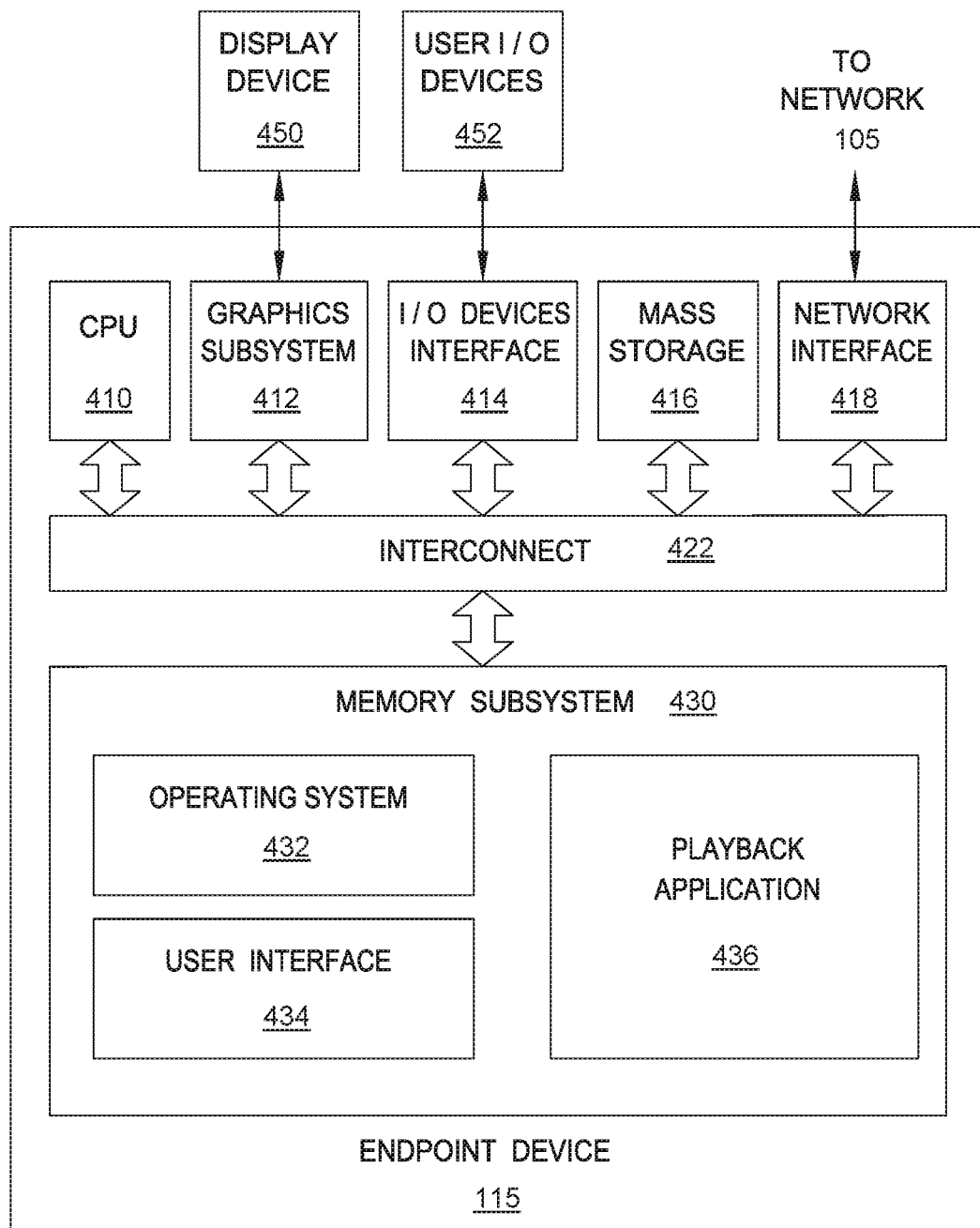
FIG. 4 is a more detailed illustration of the endpoint device of FIG. 1, according to various embodiments of the present invention.

FIG. 4 is a more detailed illustration of the endpoint device 115 of FIG. 1, according to various embodiments of the present invention. As shown, the endpoint device 115 may include, without limitation, a CPU 410, a graphics subsystem 412, an I/O device interface 414, a mass storage unit 416, a network interface 418, an interconnect 422, and a memory subsystem 430.

In some embodiments, the CPU 410 is configured to retrieve and execute programming instructions stored in the memory subsystem 430. Similarly, the CPU 410 is configured to store and retrieve application data (e.g., software libraries) residing in the memory subsystem 430. The interconnect 422 is configured to facilitate transmission of data, such as programming instructions and application data, between the CPU 410, graphics subsystem 412, I/O devices interface 414, mass storage 416, network interface 418, and memory subsystem 430.

In some embodiments, the graphics subsystem 412 is configured to generate frames of video data and transmit the frames of video data to display device 450. In some embodiments, the graphics subsystem 412 may be integrated into an integrated circuit, along with the CPU 410. The display device 450 may comprise any technically feasible means for generating an image for display. For example, the display device 450 may be fabricated using liquid crystal display (LCD) technology, cathode-ray technology, and light-emitting diode (LED) display technology. An input/output (I/O) device interface 414 is configured to receive input data from user I/O devices 452 and transmit the input data to the CPU 410 via the interconnect 422. For example, user I/O devices 452 may comprise one of more buttons, a keyboard, and a mouse or other pointing device. The I/O device interface 414 also includes an audio output unit configured to generate an electrical audio output signal. User I/O devices 452 includes a speaker configured to generate an acoustic output in response to the electrical audio output signal. In alternative embodiments, the display device 450 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the CPU 410 via the interconnect 422.

In some embodiments, the memory subsystem 430 includes programming instructions and application data that comprise an operating system 432, a user interface 434, and a playback application 436. The operating system 432 performs system management functions such as managing hardware devices including the network interface 418, mass storage unit 416, I/O device interface 414, and graphics subsystem 412. The operating system 432 also provides process and memory management models for the user interface 434 and the playback application 436. The user interface 434, such as a window and object metaphor, provides a mechanism for user interaction with endpoint device 115. Persons skilled in the art will recognize the various operating systems and user interfaces that are well-known in the art and suitable for incorporation into the endpoint device 108.

In some embodiments, the playback application 436 is configured to request and receive content from the content server 105 via the network interface 418. Further, the playback application 436 is configured to interpret the content and present the content via display device 450 and/or user I/O devices 452.

Text String Repository and Translation

According to various embodiments of the present invention, a text string repository manages the translation and distribution of text strings for use by one or more applications configured to support multiple language interactions with end users. In some embodiments, new text strings for such applications may be created and posted to the repository, and/or existing text strings in the repository may be modified. In response thereto, the text string repository detects the new or changed text strings, generates translation jobs for translations of the new or changed text strings into supported languages, and makes the newly translated text strings available for use by the applications.

Figure 5:
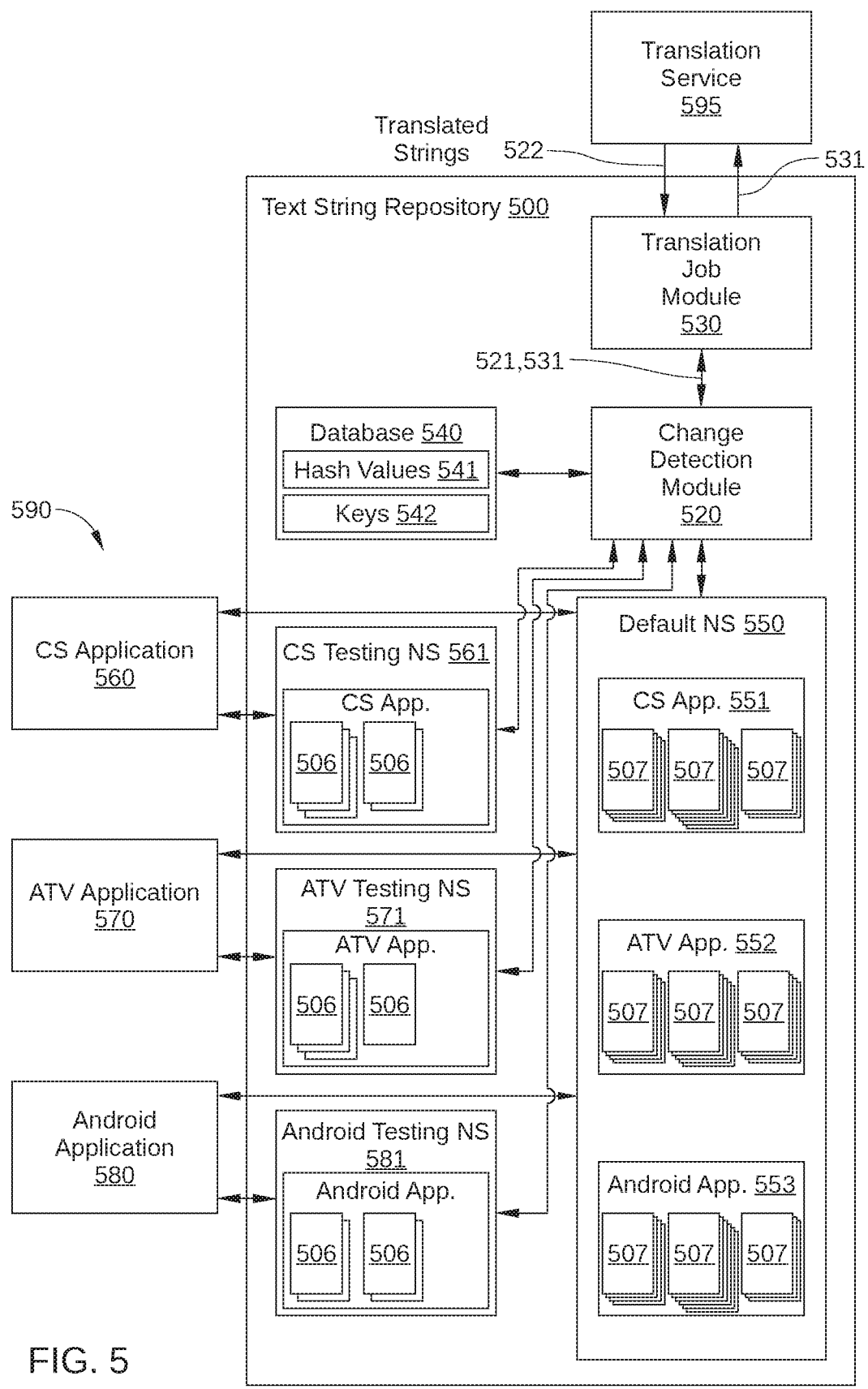
FIG. 5 illustrates a text string repository that is configured to manage the translation and distribution of text strings, and can be implemented in the network infrastructure of FIG. 1, according to various embodiments of the present invention.

FIG. 5 illustrates a text string repository 500 that is configured to manage the translation and distribution of text strings, and can be used in the network infrastructure 100 of FIG. 1, according to various embodiments of the present invention. Text string repository 500 facilitates the localization of textual content to provide a high quality user experience, for example, for an end user associated with an endpoint device 115 of network infrastructure 100 in FIG. 1. Ideally, such an end user has a similar high quality experience regardless of the country of residence of the end user or the preferred language of the end user. Consequently, user interactions with network infrastructure 100 that include a textual element, such as e-mails, graphical user interface (GUI) text strings, etc., should be presented in the preferred language of the user. For example, in embodiments in which network infrastructure 100 is involved in the distribution of digital entertainment content, such as video streaming, the localized textual content managed by text string repository 500 may include movie metadata (e.g., movie synopsis, cast information, sub-titles, etc.), marketing material, and text strings used in customer-facing applications.

As shown, text string repository 500 is communicatively coupled to one or more applications 590 that may be installed and executed on the endpoint device 115 in FIG. 1, or in a stand-alone computing device, such as that employed by a developer of the application. In addition, text string repository 500 is communicatively coupled to a translation service 595, and includes a change detection module 520, a translation job module 530, a database 540, a default namespace (NS) 550, and one or more non-default namespaces associated with each application 590. In the embodiments illustrated in FIG. 5, the non-default namespaces in text string repository 500 include at least a customer service testing namespace 561 associated with a customer service application 560, an Apple TV testing namespace 571 associated with an Apple TV application 570, and an Android testing namespace 581 associated with an Android application 580.

The constituent elements of text string repository 500, applications 590, and translation service 595 may be communicatively coupled to each other as shown via any technically feasible communication or information network or networks that allow data exchange. For example, the network or networks may be wired or wireless, and may include a wide area network (WAN), a local area network (LAN), a wireless (WiFi) network, and/or the Internet, among others.

Each of applications 590 is an application that employs textual content that varies depending on the location in which the textual content is employed. Therefore, each of applications 590 sends requests for text strings in one or more specific languages to text string repository 500, so that a specific end user can interact with that external application 590 in the preferred language of the end user. External applications 590 may include, without limitation, customer service application 560, Apple TV (ATV) application 570, Android application 580, and/or one or more additional applications, such as marketing applications, legal applications, and the like.

Customer service application 560 is configured to generate electronic responses, such as e-mails, to customer queries. Therefore, customer service application 560 employs different text strings depending on the location and/or preferred language of an end user who receives the electronic responses from customer service application 560. During operation, customer service application 560 generally requests the requisite text strings in the appropriate language from text string repository 500.

ATV application 570 is an application that is configured to enable receipt of digital data from one or more sources, such as from network infrastructure 100 in FIG. 1. ATV application 570 is further configured to stream the digital data to a suitable display device, such as a television or a smartphone screen. Thus, an ATV console on which ATV application 570 is installed may be an example of endpoint device 115 in FIG. 4, and ATV application 570 may be an example of user interface 434 and/or playback application 436 in FIG. 4. A user interface associated with ATV application 570, such as user interface 434 in FIG. 4, employs different text strings during interactions with an end user depending on the location and/or preferred language of the end user. During operation, ATV application 570 requests the requisite text strings in the appropriate language from text string repository 500. Android application 580 may be substantially similar to ATV application 570, except that Android application 580 is configured to be loaded on a device that uses an Android operating system.

For clarity, only a single instance of customer service application 560, ATV application 570, and Android application 580 is shown in FIG. 5. Typically, a plurality of such applications may be communicatively coupled to text string repository 500, in particular ATV application 570 and Android application 580. For example, thousands or even millions of different instances of ATV application 570 and/or Android application 580 may be communicatively coupled to text string repository 500, either directly or indirectly.

Change detection module 520 is configured to determine when one or more source language text strings should be transmitted to translation service 595. In some embodiments, when a particular source language text string that is employed by one or more of applications 590 is modified, then change detection module 520 determines that the source language text string is a "dirty" text string 521, i.e., a source language text string that requires translation into one or more target languages. Generally, the target languages include all languages supported by the application or applications 590 that employ that particular source language text string. Thus, when a developer of an application 590 modifies the wording of a particular text string in the source language, for example English, change detection module 520 determines that that particular text string should be transmitted to translation service 595 for translation into the target languages supported by the application 590. Change detection module 520 may employ various change detection schemes, described below, to detect when a particular source language text string has been modified, and therefore is dirty.

In some embodiments, when a new source language text string is made available for use in one or more of applications 590 (for example, when added to test string repository 500 by the developer of a particular application 590), change detection module 520 determines that the new source language text string is a dirty text string. Therefore, the new source language text string will be translated into all languages supported by the application or applications 590 that employ that particular text string. For example, when a developer of ATV application 570 publishes an additional text string into ATV testing namespace 571 for use in ATV application 570, change detection module 520 indicates that the additional text string is dirty and should be transmitted to translation service 595 for translation into the target languages supported by the application 590.

In some embodiments, change detection module 520 is configured to perform change detection during normal operation in default namespace 550 and in non-default namespaces CS testing namespace 561, ATV testing namespace 571, and Android testing namespace 581. In other embodiments, change detection module 520 may be configured to perform change detection in one or more non-default namespaces only when requested, for example by a developer of a particular application 590.

Translation job module 530 is configured to generate translation jobs 531 based on dirty text strings 521 detected by change detection module 520. In addition, translation job module 530 is configured to transmit translation jobs 531 to translation service 595, as shown in FIG. 5, receive translated text strings 522 from translation service 595, and provide translated text strings 522 to change detection module 520. Each translation job 531 generated by translation job module 530 may be based on a single dirty text string 521, a text string bundle 506 or 507 that includes one or more dirty text strings 521, a target language in which one or more dirty text strings 521 need to be translated, etc. In some embodiments, translation job 530 may be configured to receive translation jobs from certain instances of applications 590, such as an instance of an application 590 that is employed by a developer of the application 590.

Translation service 595 may be any technically feasible translation process capable of translating the textual content of source language text strings into one or more text strings that each include a translation in a different target language. For example, in some embodiments, translation service 595 may include a manual translation service, in which all textual content is translated manually by a linguist or a linguist using a computer-aided translation tool. Additionally or alternatively, in some embodiments, translation service 595 may include a partially automated translation service that at least partially translates a text string in a source language by searching previously translated textual content for matching or partially matching textual content. Additionally or alternatively, in some embodiments, translation service 595 may include a fully automated translation process, such as a machine translation application.

Database 540 stores keys 542 and, in some embodiments, hash values 541. Keys 542 include the keys for text strings stored in default namespace 550, customer service (CS) testing namespace 561, ATV testing namespace 571, and Android testing namespace 581. For example, in some embodiments, a different unique key 542 is associated with each source language text string that is stored in text string repository 500 and is available for use by one or more applications 590. Thus, when a new source language text string is added to any namespace in text string repository 500 (i.e., default namespace 550, CS testing namespace 561, ATV testing namespace 571, or Android testing namespace 581), a key 542 associated with the new source language text string is stored in database 540. Conversely, when a particular source language text string is removed from a namespace in text string repository 500, the key 542 associated with that particular source language text string is removed from database 540.

In some embodiments, some or all of keys 542 include a bundle/namespace pair that indicates the logical location in text string repository of the value or values associated with such keys. Consequently, a key stored in one namespace can be identical to a key stored in a different namespace, except for the bundle/namespace pair. In such embodiments, merging of keys and associated values from one namespace to another namespace is greatly facilitated, since the merging process for a key can be performed by changing the bundle/namespace pair of the key to the bundle/namespace pair into which the key is being merged. For example, the value (or values) associated with a particular key 542 may reside in a specific bundle 506 in the CS application portion of CS testing namespace 561. Therefore, that particular key 542 is generally configured to include a bundle/namespace pair that references CS testing namespace 561 and that specific bundle 506. The value (or values) can then be merged to the CS application portion 551 of default namespace 550 by changing the particular key 542 to include the bundle/namespace pair that references default namespace 550 and a bundle 507 in CS application portion 551.

In some embodiments, each of keys 542 is associated with one or more additional text strings in addition to a source language text string, where each additional text string is an additional value associated with the key 542. In such embodiments, each of the one or more additional text strings associated with the key 542 includes a translation in a different target language of the textual content of the source language text string associated with the same key 542.

In some embodiments, change detection module 520 detects changes to existing source language text strings using a hash-based change detection scheme. In such embodiments, database 540 stores a plurality of hash values 541. Hash values 541 facilitate detection of changes to source language text strings that reside in text string repository 500. In some embodiments, database 540 stores a hash value 541 for each bundle 506 and bundle 507 included in text string repository 500. For example, when a new source language text string is added to default namespace 550 or to a non-default namespace of text string repository 500, a hash value 541 is generated for the bundle 506 or 507 in which the new source language text string resides, and is stored in database 540. Thus, to detect whether any source language text strings in a particular bundle 506 or 507 has been modified, change detection module 520 can compare the stored hash value 541 for that particular bundle 506 or 607 to a current hash value of the particular bundle 506 or 507. Change detection module 520 can determine on a per-bundle basis whether source language text strings have been modified. Alternatively, when a new source language text string is added to default namespace 550 or to a non-default namespace of text string repository 500, a hash value 541 is generated for that new source language text string and stored in database 540. In such embodiments, change detection module 520 can determine on a per-key basis which specific source language text strings have been modified.

In some embodiments, rather than hash values 541, change detection module 520 may employ for change detection any other technically feasible tracking values that are each uniquely associated with a different bundle or key. For example, a timestamp indicating the time of modification of a key or bundle may be employed in lieu of hash value 541. In such embodiments, database 540 may store these tracking values rather than storing hash value 541.

Default namespace 550 is a logical container that is globally unique within text string repository 500. As shown, default namespace 550 typically includes one or more bundles 507 that each include one or more values. For example, each value in a particular bundle 507 may be a text string that is available for use in one or more applications 590 and is associated with one of keys 542. In some embodiments, multiple values that are each a text string in a different language may be associated with a particular key 542, as described above.

In some embodiments, default namespace 550 stores production strings, which are the text strings employed by applications 590 during normal operation. In such embodiments, default namespace 550 may be configured as a merge destination of changes made to values (i.e., text strings) in other namespaces included in text string repository 500. Consequently, modifications of text strings residing in a testing namespace and/or newly created text strings can be held back from default namespace 550 while being tested. For example, a developer of one particular application 590 can confirm that that particular application functions correctly with new and/or modified text strings that are stored in a bundle 506 in a non-default namespace associated with that particular application. The developer can then merge the bundle 506 of new and/or modified text strings with a corresponding bundle 507 of text strings already stored in default namespace 550, where the newest version of a particular key 542 supersedes the previous version. Consequently, the many instances of the application 590 that are loaded on endpoint devices 115 can operate using the newest version of the values (i.e., text strings) associated with a particular key 542 without being re-installed in the endpoint device 115; the new version of values are dynamically and transparently updated within text string repository 500.

Non-default namespaces included in text string repository 500, e.g., CS testing namespace 561, ATV testing namespace 571, and Android testing namespace 581, may be substantially similar to default namespace 550, and may each include bundles in which multiple values associated with keys 542 may reside. As described above, in some embodiments, some or all keys 542 that reference a particular bundle 506 in one of the non-default namespace may be identical to respective keys 542 that reference a particular bundle 507 in default namespace 550, except for the bundle/namespace pair.

Bundles 506 and bundles 507 store values, such as source language text strings and text strings that each include a translation in a different target language of the textual content of a source language text string. In some embodiments, each bundle 506 and each bundle 507 stores, for a particular key 542, a single source language text string and one or more text strings that each include a translation in a different target language of the textual content of the single source language text string associated with the particular key 542. In some embodiments, bundles 506, which reside in non-default namespaces, may include selected translations for a particular source language text string. By contrast, in such embodiments, bundles 507 may generally include translations for each language supported by applications 590 of the textual content of the single source language text string.

For example, testing of a new source language text string for use in CS application 560 may be performed via a particular bundle 506 in CS testing namespace 561. The bundle 506 may include one or two text strings that each include a translation in a different target language of the textual content of the new source language text string. Thus, the bundle 506 in CS testing namespace 561 employed in such testing may only include the new source language text string and the one or two text strings that include a translation of the new source language text string. By contrast, once the testing is complete and the new source language text string is merged to default namespace 550, the corresponding bundle 507 in default namespace 550 can then be populated with a text string for each language supported by CS application 560. These text strings, along with the new source language text string, make up the values for a single key 542 that references the bundle 507 and default namespace 550 with a suitable bundle/namespace pair. According to one or more embodiments described herein, change detection module 520 is configured to determine that for such a new source language text string, the new source language text string should be translated into one or more text strings that each include a translation in a different target language of the textual content of the new source language text string. Thus, the bundle 507 can be populated with text strings that include translations of the new source language text string in all the languages supported by CS application 560.

By way of illustration, text string repository 500 is illustrated conceptually as a single entity in FIG. 5, however, in some embodiments, text string repository 500 may be implemented as a distributed computing system across multiple computing devices. In a similar vein, change detection module 520, translation job module 530, database 540, default namespace 550, and non-default namespaces CS testing namespace 561, ATV testing namespace 571, and Android testing namespace 581 may each be configured as a service that is distributed over multiple machines, so that the functionality of any one thereof is not vulnerable to a single point of failure. Furthermore, the various functions of text string repository 500 that are divided between change detection module 520, translation job module 530, database 540, default namespace 550, and non-default namespaces CS testing namespace 561, ATV testing namespace 571, and Android testing namespace 581 may be combined into a single service, or rearranged between multiple additional services, and are not limited the configuration illustrated in FIG. 5.

Figure 6:
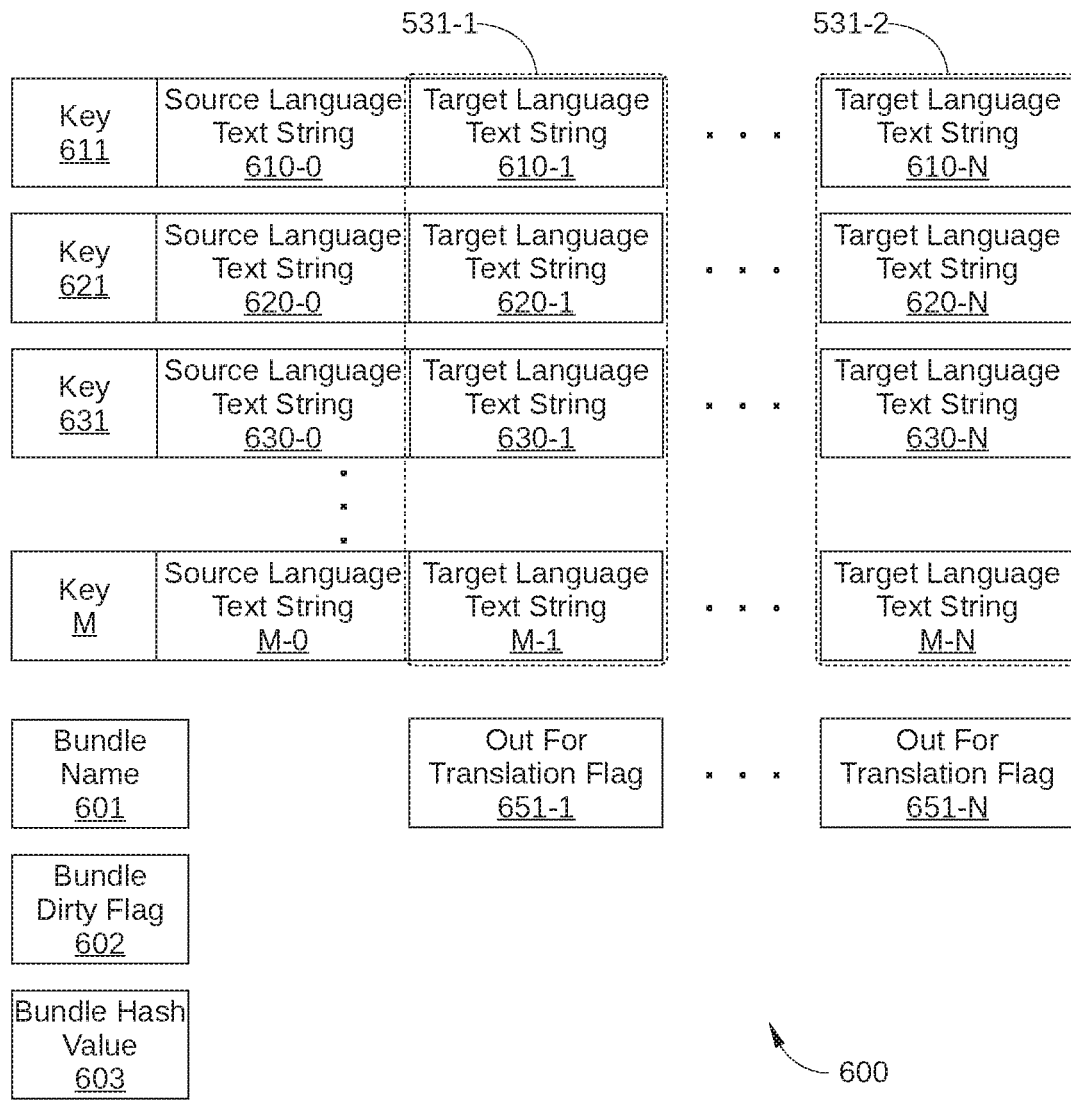
FIG. 6 is a schematic diagram of a text string bundle, according to various embodiments of the present invention.

FIG. 6 is a schematic diagram of a text string bundle 600, according to various embodiments of the present invention. Text string bundle 600 may be employed as one or more of bundles 506 in non-default namespaces CS testing namespace 561, ATV testing namespace 571, or Android testing namespace 581, and/or as one or more bundles 507 in default namespace 550. Text string bundle 600 may include one or more of a bundle name 601, a bundle dirty flag 602, a bundle hash value 603, and a plurality of out-for-translation flags 651-1-651-N. In addition, text string bundle 600 includes the values, i.e., text strings, for M different keys 611, 621, 631, . . . , M that are associated with text string bundle 600. In the embodiment illustrated in FIG. 6, text string bundle 600 also includes keys 611-M as metadata, but in other embodiments, text string bundle 600 does not necessarily include keys 611-M.

As shown, for each of keys 611-M in text string bundle 600, there are typically N text strings, or values, associated with that key. Specifically, for each of keys 611-M, a source language text string and one or more target language text strings are generated with the key, up to a total of N+1 text strings, where N is the number of target languages supported by the application 590 with which text string bundle 600 is associated. In embodiments in which text string bundle 600 is included in default namespace 550, each key generally has a total of N target language text strings. Thus, a source language text string 610-0, a target language text string 610-1, a target language text string 610-2, and so on to target language text string 610-N are associated with key 611. Similarly, a source language text string 620-0, a target language text string 620-1, a target language text string 620-2, and so on to target language text string 620-N are associated with key 621, and so forth. In embodiments in which text string bundle 600 is included in a non-default namespace, each key in text string bundle 600 may include a smaller number of target language text strings.

Bundle name 601 may be any suitable and globally unique identifier for text string bundle 600. Bundle dirty flag 602 indicates whether one or more source language text strings 610-0, 620-0, . . . , or M-0 has been modified, indicating that some or all text strings included in text string bundle 600 should be translated. In some embodiments, bundle dirty flag 602 is set to dirty when a source language text string is added to text string bundle 600. Therefore, in such embodiments, when text strings from a non-default namespace are merged with the data of text string bundle 600, text string bundle 600 is automatically flagged as dirty. Additionally or alternatively, in some embodiments, bundle dirty flag 602 is set to dirty when change detection module 520 in FIG. 5 detects that one or more source language text strings in text string bundle 600 have been modified. For example, due to such a modification, change detection module 520 may determine that a stored hash value for text string bundle 600 is different from a currently computed hash value for text string bundle 600, such as bundle hash value 603.

Bundle hash value 603 includes a current hash value associated with text string bundle 600. In some embodiments, bundle hash value 603 may be computed based on a hash of all of the source language text strings included in text string bundle 600, and may be computed whenever a source language text string is added to text string bundle 600. Consequently, change detection module can detect in a computationally efficient manner that text string bundle 600 has been modified, by comparing bundle hash value 603 to a previously stored bundle hash value for text string bundle 600, such as a hash value 541 in database 540.

In some embodiments, the source language text strings 610-0, 620-0, . . . , and M-0 are sent to translation service 595 for translation. In such embodiments, one translation job 531-1 may include populating all of the target language text strings in text string bundle 600 for one particular target language, another translation job 531-2 may include populating all of the target language text strings in text string bundle 600 for another target language, and so on. In such embodiments, out-for-translation flags 651-1-651-N may be employed to track what translation jobs 531 have been completed and what translation jobs 531 are still pending. When all of out-for-translation flags 651-1-651-N indicate that no translation jobs 531 associated with text string bundle 600 are pending, bundle dirty flag 603 can be reset to indicate that text string bundle 600 is no longer dirty.

Figure 7:
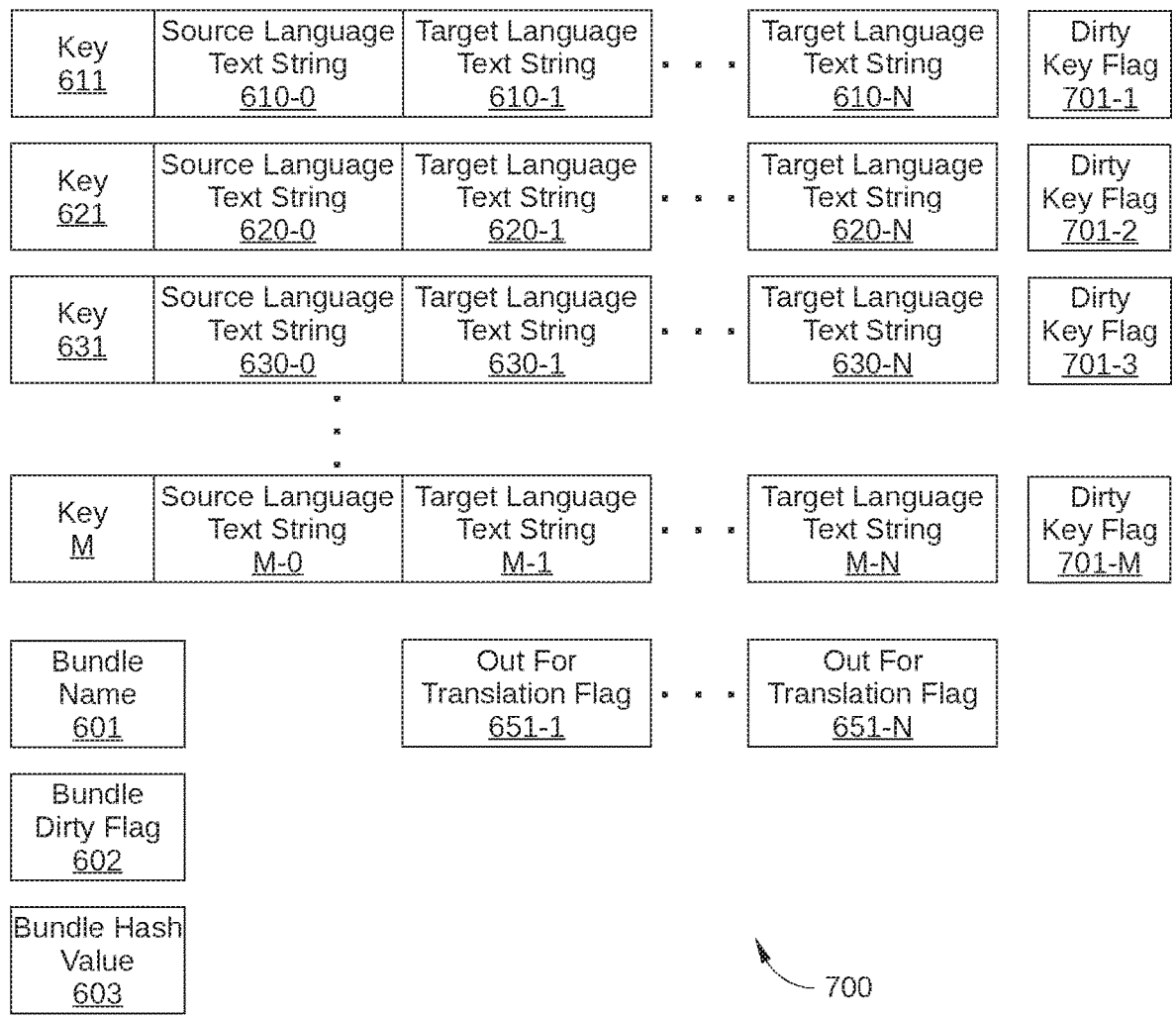
FIG. 7 is a schematic diagram of a text string bundle, according to other various embodiments of the present invention.

FIG. 7 is a schematic diagram of a text string bundle 700, according to other various embodiments of the present invention. Text string bundle 700 may be substantially similar to text string bundle 600, except that text string bundle 600 also includes a plurality of dirty key flags 701-1-701-M. As shown, in such an embodiment, a dirty key flag is associated with each of keys 611-M. Dirty key flags 701-1-701-M may be employed in lieu of or addition to bundle dirty flag 602. In some embodiments, using dirty key flags 701-1-701-M, change detection module 520 can track whether the source language text string for each of keys 611-M has been modified, and therefore in need of translation. Thus, the need for translation can be performed on a per-key basis, rather than on a per-bundle basis. In such embodiments, the dirty source language text strings of text string bundle 700 can be transmitted to translation service 595 for translation, while source language text strings in text string bundle 700 that are not dirty are not transmitted to translation service 595, thereby avoiding sending source language text strings to translation service 595 that do not need translation.

Figure 8:
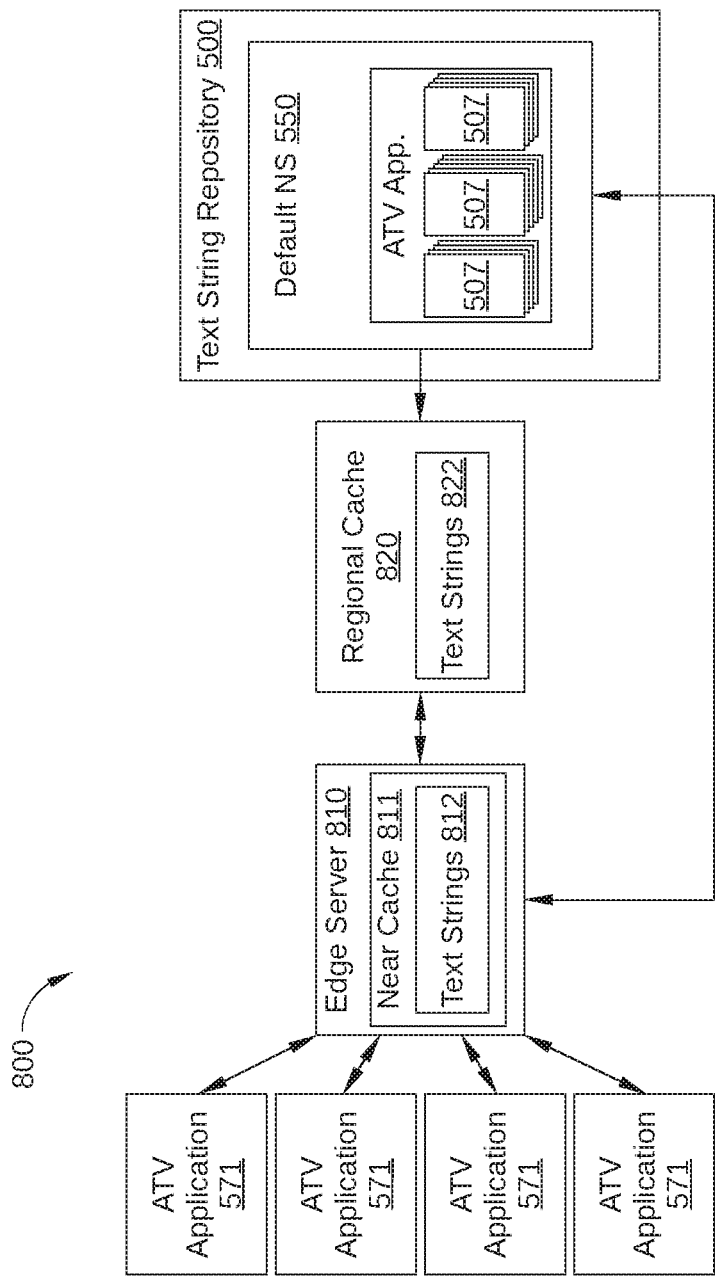
FIG. 8 illustrates a text string caching system that can be employed in conjunction with the network infrastructure of FIG. 1, according to various embodiments of the present invention.

FIG. 8 is an illustration of a text string caching system 800 that can be employed in conjunction with network infrastructure 100, according to various embodiments of the present invention. Text string caching system 800 is configured to timely provide up-to-date text strings used in the network infrastructure 100 of FIG. 1 to multiple instances of an application, such as ATV application 571. As shown, a plurality of ATV applications 571 generally request text strings from an edge server 810, rather than directly from default namespace 550 in text string repository 500. Only four instances of ATV application 571 are depicted in FIG. 8, but in normal operation, typically millions or more instances of ATV application 571 may be communicatively coupled to edge server 810. According to some embodiments, to facilitate scaling to accommodate the large number of ATV applications 571 making requests for text strings, edge server 810 and regional cache 820 may be employed. While only a single instance of edge server 810 is depicted in FIG. 8, in normal operation text string caching system 800 may include hundreds or thousands of edge servers 810.

Edge server 810 includes a near cache that stores text strings 812, while regional cache 820 includes text strings 822. Text strings 812 include text strings that are more recently used by ATV applications 571, while text strings 822 are text strings that are periodically pushed to region cache 820 by text string repository 500 when translated from a source language text string. Thus, regional cache 820 is more likely to have a more comprehensive collection of text strings than near cache 811, which may have limited size, and is updated based on what text strings are most recently used by ATV applications 571.

Typically, edge server 810 is physically closer to ATV applications 571 than regional cache 820 or text repository 500. As a result, edge server can therefore provide requested text strings to ATV applications 571 with lower latency, when the requested text strings are included among text strings 812. When a text string requested by an ATV application 571 is not among text strings 812, edge server 810 queries regional cache 820 for the requested text string. When the text string requested by the ATV application 571 is also not among text strings 822, edge server 810 queries regional default namespace 550 for the requested text string.

Managing Translation and Distribution of Text Strings

Figure 9:
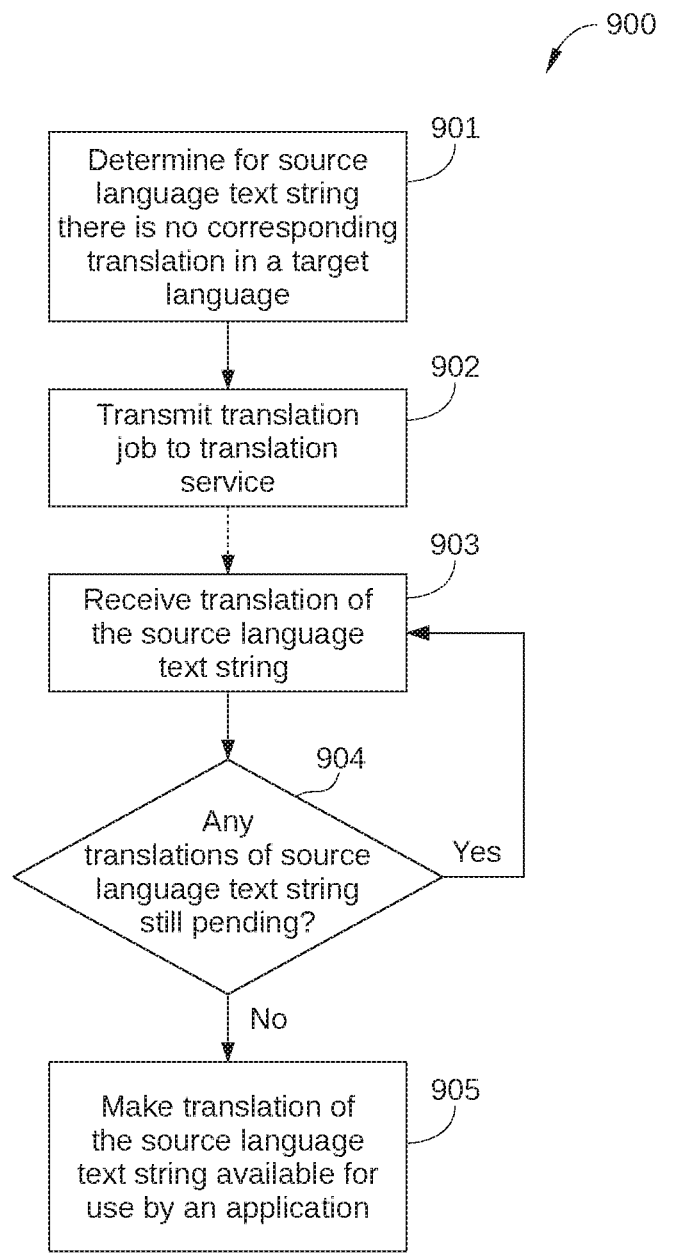
FIG. 9 sets forth a flowchart of method steps for managing translation of text strings, according to various embodiments of the present invention.

FIG. 9 sets forth a flowchart of method steps for managing translation of text strings, according to various embodiments of the present invention. Although the method steps are described with respect to the systems of FIGS. 1-8, persons skilled in the art will understand that any system configured to perform the method steps, in any order, falls within the scope of the present disclosure.

As shown, a method 900 begins at step 901, in which change detection module 520 determines, for a particular source language text string in text string repository 500, that there is no corresponding text string that includes a translation of the source language text string. In terms of text string bundle 600, change detection module 520 determines that for one or more of source language text strings 610-0-610-N, there is not a corresponding target language text string. For example, in step 901, change detection module 520 determines that for source language text string 610-0, one or more of target language text strings 610-1-610-N are not present. Thus, source language text string 610-0 should be transmitted to translation service 595 for translation. As a result of such translation, the application 590 that uses source language text string 610-0 will also have available for use all corresponding text strings in all target languages supported by the application 590. One or more change detection schemes may be employed by change detection module 520 in step 901, including hash-based detection schemes and a dirty-flag-based detection scheme.

In one hash-based detection scheme, change detection module 520 computes, for each key 542 in database 540, a current hash value, and compares the current hash value to a stored hash value 541 (stored in database 540) mapped to or otherwise associated with that key 542. A non-zero difference between the currently computed hash value and the stored hash value 541 for a particular key 542 indicates that the source language text string associated with that particular key 542 has been modified. Therefore, this source language text string should be translated into the appropriate target languages. That is, target language text strings for the requisite target languages should be generated for the source language text string determined to have been modified. In such embodiments, a dirty key flag, such as one of dirty key flags 701-1-701-M, may be employed to indicate that a particular source language text string has been modified and should be translated into target languages.

In another hash-based detection scheme, change detection module 520 computes, for each bundle 506 and 507 in text string repository 500, a current hash value, such as bundle hash value 603, and compares the current hash value to a stored hash value 541 (stored in database 540) that is mapped to or otherwise associated with that bundle 506 or 507. A non-zero difference between the currently computed hash value and the stored hash value 541 for a particular bundle 506 or 507 indicates that the source language text string associated with that particular bundle 506 or 507 has been modified. Therefore, all source language text strings included in that bundle 506 or 507 should be translated into the appropriate target languages. In such embodiments, a bundle dirty flag, such as bundle dirty flag 602, may then be employed to indicate that a particular bundle 506 or 507 has been modified.

In some embodiments, change detection module 520 may perform a hash-based change detection scheme periodically and/or in response to certain events. For example, one such event may be the receipt of new text strings from one of applications 590, and change detection module 520 causes the new text strings to be made available for use by the application 590.

In some embodiments, change detection module 520 may employ a dirty-flag-based detection scheme in step 901. For example, in some embodiments, change detection module 520 searches all namespaces within text string repository 500 for bundles 506 or 507 that have a bundle dirty flag 603 indicating that the bundle 506 or 507 has been modified. In such embodiments, bundle dirty flag 603 for a particular bundle is typically set to indicate that particular bundle is dirty when a source language text string is added to or modified in the bundle. In some embodiments, change detection module 520 may perform a dirty-flag-based change detection scheme periodically and/or in response to certain events.

In step 902, translation job module 530 transmits translation jobs 531 to translation service 595. Translation jobs 531 generated in step 902 may be based on a single dirty source language string, the multiple source language strings included in a single dirty bundle, etc. In step 903, translation job module 530 receives translated text strings 522 from translation service 595, and provides translated text strings 522 to change detection module 520. Each translated text string 522 received in step 903 includes a translation in a particular target language of the textual content of a source language text string included in the translation job 531.

In step 904, change detection module 520 determines whether any translations of the one or more source language text strings included in the translation job 531 are pending completion. For example, in some embodiments, out-for-translation flags 651-1-651-N may be employed by change detection module 520 to make the determination in step 904 for each bundle included in the translation job 531. If yes, method 900 proceeds back to step 903; if no, method 900 proceeds to step 905.

In step 905, change detection module 520 causes the translations of the source language to be available for use by an application 590. For example, in some embodiments, change detection module 520 publishes the translated text strings 522 to a cache or other repository, such as default namespace 550. These translated text strings 522 are the translations associated with the source language text strings included in the translation job 531, and are used to populate a bundle 506 or 507 with the appropriate target language text strings for each source language text string in the bundle.

As described herein, various functions are performed by text string repository 500. Such functions may be implemented as one or more applications executed by one or more computing devices associated with text string repository 500. For example, a change detection application may be employed for determining when one or more source language text strings should be transmitted to translation service 595, and a translation job application may be employed for generating translation jobs 531 based on dirty text strings 521 detected by change detection module 520. Such applications may be executed on content server 110 in FIG. 1, control server 120 in FIG. 2, and/or on a stand-alone computing device. One such computing device is described below in conjunction with FIG. 10.

Figure 10:
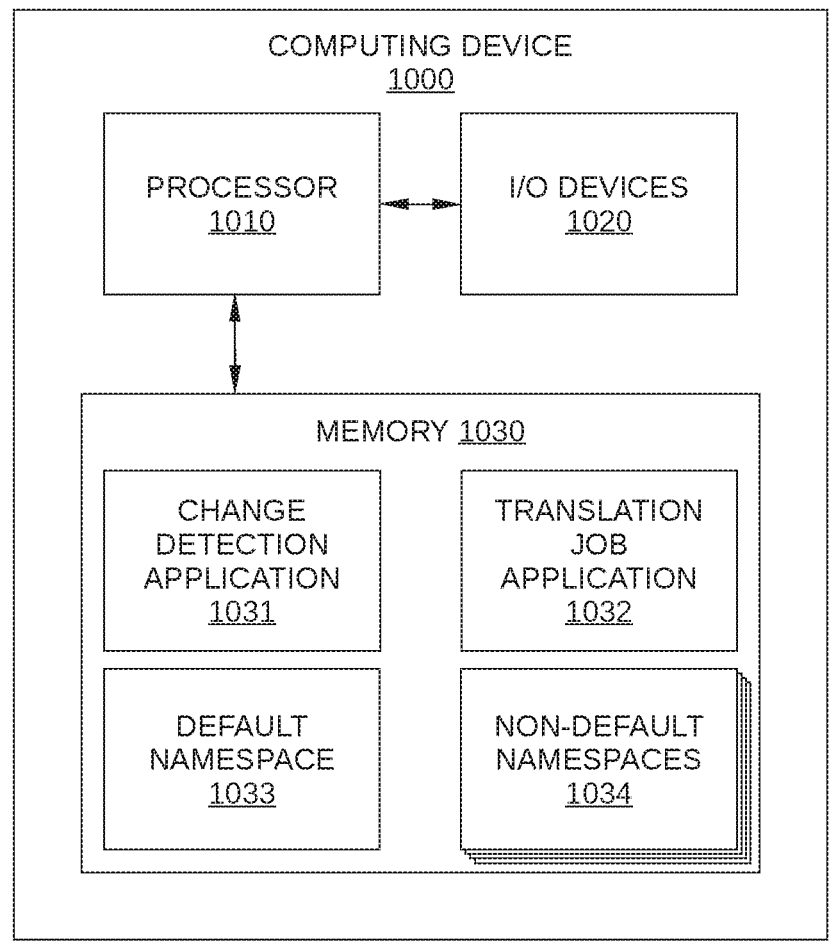
FIG. 10 is an illustration of a computing device configured to implement one or more functions of the text string repository of FIG. 5, according to various embodiments.

FIG. 10 is an illustration of a computing device 1000 configured to implement one or more functions of the text string repository of FIG. 5, according to various embodiments. Computing device 1000 is configured to manage the translation and distribution of text strings in a network infrastructure, according to one or more embodiments of the present invention.

Computing device 1000 may be any type of device capable of executing application programs including, without limitation, instructions associated with a change detection application 1031, a translation job application 1032, a default namespace 1033, and/or one or more non-default namespaces 1034. For example, and without limitation, computing device 1000 may be a laptop, a tablet, a smartphone, etc. In the embodiment illustrated in FIG. 10, computing device 1000 includes, without limitation, a processor 1010, input/output (I/O) devices 1020, and a memory 1030.

Processor 1010 may be implemented as a central processing unit (CPU), a graphics processing unit (GPU), an ASIC, an FPGA, any other type of processing unit, or a combination of different processing units. In general, processor 1010 may be any technically feasible hardware unit capable of processing data and/or executing software applications to facilitate execution of change detection application 1031, translation job application 1032, default namespace 1033, and/or one or more non-default namespaces 1034, as described herein. Among other things, and without limitation, processor 1010 may be configured to execute instructions associated with change detection application 1031, translation job application 1032, default namespace 1033, and/or one or more non-default namespaces 1034.

I/O devices 1020 may include input devices, output devices, and devices capable of both receiving input and providing output. Memory 1030 may include a memory module or a collection of memory modules. As shown, in some embodiments, some or all of change detection application 1031, translation job application 1032, default namespace 1033, and/or one or more non-default namespaces 1034 may reside in memory 1030 during operation.

Computing device 1000 may be implemented as a stand-alone chip, such as a microprocessor, or as part of a more comprehensive solution that is implemented as an application-specific integrated circuit (ASIC), a system-on-a-chip (SoC), and so forth. Generally, computing device 1000 may be configured to coordinate the overall operation of a computer-based system. In other embodiments, computing device 1000 may be coupled to, but separate from such a computer-based system. In such embodiments, the computer-based system may include a separate processor that transmits input to computing device 1000, such as digital images and/or digital videos, and receives output from computing device 1000. However, the embodiments disclosed herein contemplate any technically feasible system configured to implement change detection application 1031, translation job application 1032, default namespace 1033, and/or one or more non-default namespaces 1034, in any combination. In alternative embodiments, rather than being configured as a single machine, computing device 1000 may be configured as a distributed computing system, such as a cloud-computing system. Alternatively or additionally, in some embodiments, rather than being configured as one or more stand-alone machines, computing device 1000 may be associated with or included in one or more of content servers 110 and/or control servers 120 in FIG. 1. For example, and without limitation, the functionality of computing device 1000 may be incorporated into CPU 204 of content server 110, shown in FIG. 2. In such embodiments, change detection application 1031, translation job application 1032, default namespace 1033, and/or one or more non-default namespaces 1034 may reside in one or more of content servers 110 and/or control servers 120 during operation.

In sum, a text string repository manages the translation of source language text strings and the distribution of translated text strings that are used by an application in a network infrastructure 100. When modification of existing source language text strings and/or addition of new source language text strings are detected, translation jobs are generated based on the detected modifications and additions. When the translation jobs for all target languages are completed, and translated text strings have been received, the translated text strings are made available for use by the application.

At least one advantage of the disclosed techniques is that translated text strings can be made available for an application dynamically, so that the application does not need to be relaunched to use newly translated text strings.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

What is claimed is:

1. A computer-implemented method, comprising:
determining, based on one or more dirty flags indicating a change to one or more existing source language text strings included in a text string repository, that a source language text string associated with an application has not been translated;
transmitting a translation job that includes the source language text string to a translation service in order to have the source language text string translated into a translated text string;
tracking a progress of the translation job via one or more out-for-translation flags associated with the translation job and a unique key for the source language text string, wherein the unique key references a first logical container and a first bundle that stores the source language text string and is included in the first logical container;
receiving the translated text string from the translation service; and
causing the translated text string to be available for use by the application.

2. The computer-implemented method of claim 1, wherein determining that the source language text string associated with an application has not been translated comprises reading a first dirty flag included in the one or more dirty flags to determine that the first dirty flag is set.

3. The computer-implemented method of claim 1, further comprising merging the translated text string into a second logical container by changing the unique key to reference the second logical container.

4. The computer-implemented method of claim 1, wherein the one or more dirty flags includes a dirty key flag associated with the unique key, wherein the dirty key flag indicates that the source language text string has not been translated.

5. The computer-implemented method of claim 1, wherein the translated text string is associated with the unique key.

6. The computer-implemented method of claim 1, wherein the one or more dirty flags includes a dirty bundle flag that indicates that at least one source language text string in the first bundle has not been translated.

7. The computer-implemented method of claim 1, wherein a first dirty flag in the one or more dirty flags is set when the source language text string is added to the application.

8. The computer-implemented method of claim 1, wherein a first dirty flag in the one or more dirty flags is set when the source language text string is modified.

9. The computer-implemented method of claim 1, further comprising:
receiving the source language text string from the application via a first namespace, wherein the first namespace is associated with a first subset of a set of target languages; and
merging the translated text string into a second namespace, wherein the second namespace is associated with the set of target languages,
wherein the translated text string is available for use by an application via the second namespace.

10. A non-transitory computer readable medium storing instructions that, when executed by a processor, cause the processor to perform the steps of:
receiving a source language text string from an application via a first namespace, wherein the first namespace is associated with a first subset of a set of target languages;
determining, based on one or more dirty flags indicating a change to one or more existing source language text strings included in a text string repository, that the source language text string associated with the application has not been translated;
transmitting a translation job that includes the source language text string to a translation service in order to have the source language text string translated into a translated text string in a first language included in the set of target languages;
tracking a progress of the translation job via one or more out-for-translation flags associated with the translation job and a unique key for the source language text string, wherein the unique key references a first logical container and a first bundle that stores the source language text string and is included in the first logical container;
receiving the translated text string from the translation service; and
causing the translated text string to be available for use by an application.

11. The non-transitory computer readable medium of claim 10, wherein determining that the source language text string associated with an application has not been translated comprises reading a first dirty flag included in the one or more dirty flags to determine that the first dirty flag is set.

12. The non-transitory computer readable medium of claim 10, wherein the instructions further cause the processor to perform the step of merging the translated text string into a second logical container by changing the unique key to reference the second logical container.

13. The non-transitory computer readable medium of claim 10, wherein the one or more dirty flags includes a dirty key flag that indicates that the source language text string has not been translated.

14. The non-transitory computer readable medium of claim 10, wherein the translated text string is associated with the unique key.

15. The non-transitory computer readable medium of claim 10, wherein the one or more dirty flags includes a dirty bundle flag that indicates that at least one source language text string in the first bundle has not been translated.

16. The non-transitory computer readable medium of claim 10, wherein a first dirty flag in the one or more dirty flags is set when the source language text string is added to the application.

17. The non-transitory computer readable medium of claim 10, wherein a first dirty flag in the one or more dirty flags is set when the source language text string is modified.

18. The non-transitory computer readable medium of claim 10, wherein the instructions further cause the processor to perform the steps of:
receiving the source language text string from the application via a first namespace, wherein the first namespace is associated with a first subset of a set of target languages; and
merging the translated text string into a second namespace, wherein the second namespace is associated with the set of target languages,
wherein the translated text string is available for use by an application via the second namespace.

19. A computer system, comprising:
a memory storing instructions; and
a processor that is coupled to the memory and, when executing the instructions, performs the steps of:
determining, based on whether a dirty flag is set to indicate a change to one or more existing source language text strings included in a text string repository, that a source language text string associated with an application has not been translated;
transmitting a translation job that includes the source language text string to a translation service in order to have the source language text string translated into a translated text string;
tracking a progress of the translation job via one or more out-for-translation flags associated with the translation job and a unique key for the source language text string, wherein the unique key references a first logical container and a first bundle that stores the source language text string and is included in the first logical container;
receiving the translated text string from the translation service; and
causing the translated text string to be available for use by an application.

20. The computer system of claim 19, wherein the dirty flag indicates that at least one source language text string in the first bundle has not been translated.

* * * * *

UNITED STATES PATENT AND TRADEMARK OFFICE
CERTIFICATE OF CORRECTION

Page 1 of 1

PATENT NO. : 11,210,476 B2
APPLICATION NO. : 16/230883
DATED : December 28, 2021
INVENTOR(S) : Shashidhara Mathada et al.

It is certified that error appears in the above-identified patent and that said Letters Patent is hereby corrected as shown below:

On the Title Page

Item (56) OTHER PUBLICATIONS, page 2, Column 2:
Please delete "Wikipedia, XLIHH, Dec. 2015, pp. 1-5." and insert --Wikipedia, XLIFF, Dec. 2015, pp. 1-5.--.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*